US010839308B2

(12) United States Patent
Agarwal et al.

(10) Patent No.: US 10,839,308 B2
(45) Date of Patent: Nov. 17, 2020

(54) CATEGORIZING LOG RECORDS AT RUN-TIME

(71) Applicant: International Business Machines Corporation, Armonk, NY (US)

(72) Inventors: Manoj K. Agarwal, Bangalore (IN); Prasad M. Deshpande, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1280 days.

(21) Appl. No.: 14/980,963

(22) Filed: Dec. 28, 2015

(65) Prior Publication Data
US 2017/0185576 A1     Jun. 29, 2017

(51) Int. Cl.
*G06N 20/00* (2019.01)
*G06F 16/35* (2019.01)
*G06F 16/24* (2019.01)
*G06F 16/2455* (2019.01)

(52) U.S. Cl.
CPC ............ *G06N 20/00* (2019.01); *G06F 16/24* (2019.01); *G06F 16/24568* (2019.01); *G06F 16/355* (2019.01)

(58) Field of Classification Search
CPC .. G06F 16/00; G06F 16/137; G06F 16/24568; G06F 16/24; G06F 16/285; G06F 16/30; G06F 16/355; G06F 16/35; G06F 16/353; G06F 16/31; G06F 16/313
See application file for complete search history.

(56) References Cited

U.S. PATENT DOCUMENTS

| | | | |
|---|---|---|---|
| 9,262,519 B1* | 2/2016 | Saurabh | G06F 17/3071 |
| 2011/0185234 A1* | 7/2011 | Cohen | G06F 11/3476 |
| | | | 714/37 |
| 2011/0276781 A1* | 11/2011 | Sengupta | G06F 12/0862 |
| | | | 711/216 |
| 2014/0317137 A1 | 10/2014 | Hanaoka | |
| 2016/0092552 A1* | 3/2016 | Morfonios | G06F 17/30091 |
| | | | 707/737 |
| 2016/0292592 A1* | 10/2016 | Patthak | G06F 11/0775 |
| 2016/0350102 A1* | 12/2016 | Karpuram | G06F 11/14 |

FOREIGN PATENT DOCUMENTS

WO     2015065388 A1     5/2015

OTHER PUBLICATIONS

Gorbovitski et al. Efficient Runtime Invariant Checking: A Framework and Case Study, WODA, 2008.

* cited by examiner

*Primary Examiner* — Robert W Beausoliel, Jr.
*Assistant Examiner* — Cheryl M Shechtman
(74) *Attorney, Agent, or Firm* — Ryan, Mason & Lewis, LLP

(57) ABSTRACT

Methods, systems, and computer program products for categorizing log records at run-time are provided herein. A computer-implemented method includes generating one or more template signatures to be associated with each of multiple templates, wherein each of the multiple templates comprises a concatenation of one or more words; processing each of multiple log records derived from a data stream to determine a composition of each of the multiple log records; matching one or more of the generated template signatures to each of the multiple log records based on the determined composition of each of the multiple log records; and outputting an identification of (i) each of the multiple log records and (ii) the one or more generated template signatures matched thereto.

18 Claims, 3 Drawing Sheets

CATEGORIZING LOG RECORDS AT RUN-TIME

FIELD

The present application generally relates to information technology, and, more particularly, to log record management techniques.

BACKGROUND

Data centers commonly generate massive amounts of log data. These log data can typically be stored and searched for root cause analysis and problem determination. Because data centers can be significant in size, the logs are commonly generated at a high rate (several terabytes of data per day, for example). Therefore, a typical log search, covering even a small time period, may return a tremendously large number of log records. It can become difficult for users to comprehend such massive amounts of information. Further, log records can often be highly repetitive in nature. That is, a large number of log records following similar templates may be generated in a short period of time, making it even more difficult for users to find log records of interest.

SUMMARY

In one embodiment of the present invention, techniques for categorizing log records at run-time are provided. An exemplary computer-implemented method can include steps of generating one or more template signatures to be associated with each of multiple templates, wherein each of the multiple templates comprises a concatenation of one or more words; processing each of multiple log records derived from a data stream to determine a composition of each of the multiple log records; matching one or more of the generated template signatures to each of the multiple log records based on the determined composition of each of the multiple log records; and outputting an identification of (i) each of the multiple log records and (ii) the one or more generated template signatures matched thereto.

In another embodiment of the invention, an exemplary computer-implemented method can include steps of generating a template signature to be associated with each of multiple templates, wherein each of the multiple templates comprises a concatenation of (i) one or more words and (ii) one or more parameters; assigning a unique identifier to each of the generated template signatures; matching one of the generated template signatures to each of multiple incoming log records based on analysis of each of the multiple log records; and outputting an identification of (i) each of the multiple log records and (ii) the unique identifier assigned to the generated template signature matched thereto.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
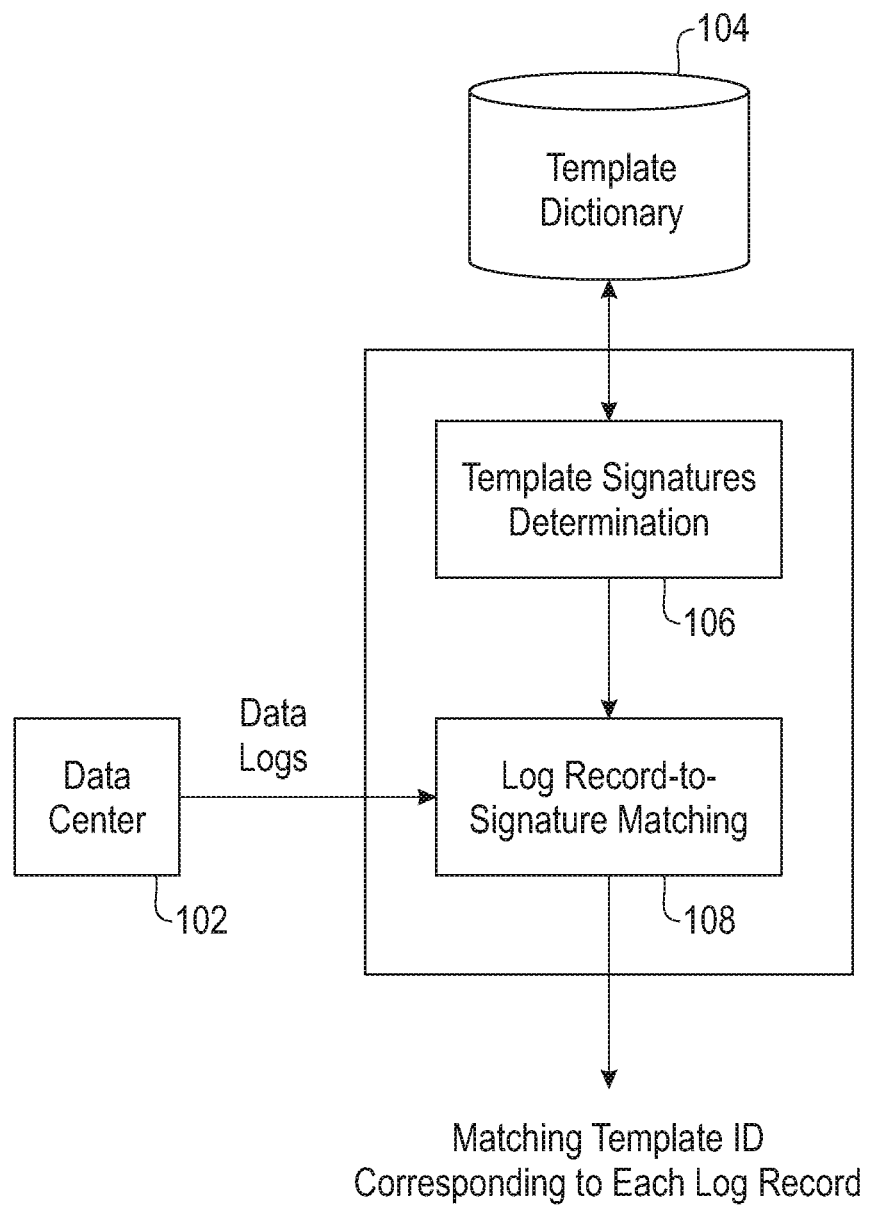
FIG. 1 is a diagram illustrating system architecture, according to an exemplary embodiment of the invention.

As described herein, an embodiment of the present invention includes categorizing log records at run-time. At least one embodiment of the invention includes categorizing log records by performing template matching for each record in given data logs. Such an embodiment can further include associating template identifiers (IDs) with each log record and identifying template types using template signatures (k-length signatures, for example) in an incoming set of data logs.

For each template in the data logs, at least one embodiment of the invention includes generating a unique k-length template signature. With the aid of this signature, such an embodiment can further include identifying the template type at ingestion time. Additionally, in one or more embodiments of the invention, the signatures are generated by identifying the word positions, that is, which particular word appears at which particular location. For example, assume that $W_1, W_2 P_1, W_3 P_2$ is a log record, and its template is $T_1$: $W_1, W_2$ <P>, $W_3$ <P>. Accordingly, the corresponding signature could be: 2, 4→$W_2, W_3$; that is, for an incoming log record, if the $2^{nd}$ and the $4^{th}$ word are $W_2$ and $W_3$, then the log record ID will be $T_1$. The signatures are constructed such that for each template type, the signatures are unique. For example, assume that there is another template, $T_2$: $W_4$, $W_2$ <P>, $W_3$ <P>, $W_5$. It can be observed that 2, 4→$W_2, W_3$ will not lead to a unique resolution of the template type (both $T_1$ and $T_2$ qualify). In that case, the signature for $T_1$ likely needs to be 1, 2, 4→$W_1, W_2, W_4$, etc.

As used herein, a template refers to a log of system and/or application records and messages. "Error" or "warning" strings can be noted as invariant templates, and other keywords can be noted as parameters. Accordingly, a template can be defined as a fixed sequence of keyword invariants and parameters. By way of illustration, consider the following example template: <P> $W_1 W_2 W_3$ <P> $W_4 W_5$, wherein <P> is a variant or a parameter, and wherein $W_i$ is an invariant keyword. Additionally, for each instance of a given template, keywords remain the same whereas parameters are typically different (although, at times, multiple instances of a template can have same parameters).

As noted above, one or more embodiments of the invention include template matching. By way of illustration, let a system trained over a given data log D contain a set of templates S, wherein |S|=N. As used herein, "N" represents the number of unique templates for the data; that is, each log record belongs to one of the N template types. An objective of one or more embodiments of the invention includes identifying one of the N templates to which an incoming log belongs.

Each template in the set is assigned a unique template ID, $T_i$, wherein $1 \leq I \leq N$. Also, consider a log data stream, $S_D$, that is being ingested, generated from the same source from which log D is generated. As used herein, a log stream is a sequence of template instances. An objective of one or more embodiments of the invention includes associating templates IDs with each incoming log message.

FIG. 1 is a diagram illustrating system architecture, according to an embodiment of the invention. By way of illustration, FIG. 1 depicts a stream of incoming data logs (containing multiple log records) provided, for example, via a data center 102. Additionally, FIG. 1 depicts a dictionary of templates 104, which stores a list of unique templates and their signatures. As further depicted in FIG. 1, a template signatures determination component 106 determines a given number of signatures of length k from the template dictionary 104. As used herein, "k" represents the minimum length of the signature.

Also, in at least one embodiment of the invention, the template signatures determination component 106 computes a probability of a match for each signature. The template signatures determination component 106 then provides the determined template signatures to log record-to-signature matching component 108, which matches one or more template signature IDs to each log record in the incoming data stream based on analysis of the log record. For a given log record stream, the above-noted analysis includes discovering a set of N templates. Accordingly, as depicted in FIG. 1, the log record-to-signature matching component 108 outputs the matching template ID that corresponds to each log record. The produced template ID is output to a database and is used to group the log records together at the time of a user query. When a user provides a search query, log records (for example, 100 log records) are returned. By way merely of example, assume that these 100 log records belong to 10 unique template IDs. Accordingly, at least one embodiment of the invention can include using the template IDs to arrange these 100 log records into 10 buckets, per their corresponding template signature.

As detailed above (for example, in connection with component 106 in FIG. 1), one or more embodiments of the invention include determining a template signature as well as a word signature. Referring again to an earlier-noted example, assume the following template $T_1$: $W_1$, $W_2$ <P>, $W_3$ <P>. Each log record belonging to this template will have $W_1$, $W_2$ and $W_3$ at positions 1, 2 and 4, but at positions 3 and 5, the log records may include different keywords, representing parameters. As such, at least one embodiment of the invention can include identifying a signature (referred to herein as a word signature) for $T_1$ as 2, $4 \rightarrow W_2$, $W_3$; that is, if $W_2$ is at position 2 and $W_3$ is at position 3 in a given log record, then that log record will be declared as being of template type $T_1$. Separately, in discovering templates for a given log, at least one embodiment of the invention includes assuming that templates exist and subsequently identifying and/or finding the corresponding signature. These signatures can be used to match a log record to its template type at run time.

As also described above, a template T is a concatenation of one or more words (or keywords) and one or more parameters such that $T = \Pi s | s \in \{W, P\}$. With respect to the variable "s," note that a log record is a concatenation. Additionally, in at least one embodiment of the invention, a word signature $T_{ws} = \Pi s | s \in \{W\}$ of a template T is an ordered sub-sequence of T such that $\forall S_i \epsilon T_{ws}, \exists S_j \epsilon T | S_i = S_j \hat{} i \leq j$. Referring again to an above-noted example, assume that the template is $T_1$ and the signature is $W_2$, $W_3$. Accordingly, the first word $W_2$ of the word signature of this template ($T_1$) is at position 2, 1<2, and the $2^{nd}$ word is at position 4, wherein 2<4. In other words, such an equation indicates that $W_2$, $W_3$ will appear in the same order as in the template, but their position in the word signature is no later than their position in the corresponding template.

Additionally, at least one embodiment of the invention includes generating a set of word signatures of length k. Such an embodiment can include arranging the set of templates whereby each word and parameter is assigned a column ID and the templates are of fixed length N such that $N = \forall t \epsilon T$; arg min$_t$(length (t)). Also, in one or more embodiments of the invention, each template is trimmed to the first N words and/or parameters. Accordingly, an objective of at least one embodiment of the invention includes identifying an optimal set of k-length signatures to uniquely identify each template.

One or more embodiments of the invention can additionally include creating an inverted index as follows: $L_i \rightarrow \{T_k | T_k(i) \text{ is a template word}\}$; $|1 \leq i \leq L$. As such, at least one embodiment of the invention includes creating an inverted list such that each $T_k$ is put into a list $L_i$ if its $i^{th}$ entry is a word, thereby resulting in a total of N lists of transactions. Further, an objective of one or more embodiments of the invention includes identifying a set of lists L such that each transaction appears in at least k lists and the number of such k-list combinations (signatures) is minimal.

Such an embodiment can include implementing an algorithm that is considered a generalization of set cover that is NP-hard because the set cover is NP-hard. Also, one or more embodiments of the invention can include implementing a greedy algorithm to minimize the number of signatures. Such an algorithm can include a total of k phases, wherein in each phase, a transaction set-cover for the transactions is identified (via the greedy algorithm). Additionally, the sets identified in a phase are removed from consideration for any further phase.

By way of illustration, consider the following example wherein the inverted lists include as follows: $W_1 \rightarrow \{T_1, T_2\}$; $W_2 \rightarrow \{T_1, T_3, T_5\}$; $W_3 \rightarrow \{T_2, T_4\}$; and $W_4 \rightarrow \{T_1, T_2, T_3, T_4, T_5\}$. Further, in this example, pertaining to the k-length signatures, let k=1. Accordingly, the greedy algorithm can identify set $W_4$ and all of the transactions are covered. Further, the 1-length signature (that is, a k-length signature wherein k=1) for each transaction is $T_i = \{4\}$.

In a separate example, let k=2. In such an example, the greedy algorithm can identify set $W_4$ and all of the transactions are covered. Further, the 1-length signature for each transaction is $T_i = \{4\}$. Set $W_4$ is subsequently removed from consideration, and in a subsequent iteration of the algorithm, two sets (set $W_2$ and set $W_3$) can be identified. Therefore, the word signature for $T_1$, $T_3$, $T_5 = \{2, 4\}$, and the word signature for $T_2$, $T_4 = \{3, 4\}$; that is, a total of two signatures of length 2 each.

Additionally, in one or more embodiments of the invention, discovering k-length signatures includes identifying a column i such that the column has the maximum number of keywords contained therein. For example, the number of keywords can be $\geq (1-p)*n$. After identifying column i, the templates are divided into two sets: (i) set 1, for which one keyword (column i) has been identified and k−1 more columns are to be discovered to create the signatures; and (ii) set 2, for which column i is a parameter and, therefore, of remaining columns, there are a maximum of only m−1 parameters out of L−1 remaining columns. Therefore, for these templates, the probability of having a word as a parameter is p' such that p'<p. Also, because the maximum number of parameters is m such that m<<L, all of the templates in set 2 can be identified using only one signature. Accordingly, for discovering k length signatures, two signatures can be identified in the identification step detailed above.

For set 1, because one column with keyword has already been identified, for the remaining columns, at least one embodiment of the invention includes determining k−1 length signatures. Accordingly, as in the identification step detailed above, two signatures will be discovered in order to discover k−1 length signatures (and so on). Because there will be a total of k steps, at least one embodiment of the invention can include discovering a total of 2*k signatures. Therefore, the total number of unique signatures will be ≤2*k. Also, in at least one embodiment of the invention, one or more of these signatures can be extended.

As also detailed herein, one or more embodiments of the invention include signature matching. When a transaction arrives, at least one embodiment of the invention includes searching for the most probable k-length signature and confirming/checking the type of the signature. If the check fails, such an embodiment of the invention includes searching for the next most probable signature (and so on). By way of illustration, consider the continuing example, wherein for a 2-length signature, when a transaction arrives, at least one embodiment of the invention includes checking for the signature's type by hashing the keywords $\{2, 4\}$. As three out of five transaction have this signature, there is a 60% chance of identifying the template using this signature. If there is a miss (that is, the check fails), the next signature $\{3, 4\}$ is tried. Accordingly, the total cost is: 1*2*0.6+2*2*0.4=2.8. In contrast, a naïve system would have incurred a cost of 5*4=20 for each incoming transaction.

By way of further illustration, consider an example scenario wherein there are N templates, each of length k. Also, let $p_i$ represent the probability of finding a template such that the most probable template is checked first (that is, $p_i > p_j$ if i<j). Therefore, the expected cost of finding a template is $\Sigma i * k * p_i$; $0 \le i \le N$.

As detailed herein, a smaller k value can lead to a more optimal solution. However, the k value must be large enough so that each template is uniquely identifiable. Accordingly, at least one embodiment of the invention can include determining the value of k as follows. The k value is set to equal 1, and the one or more 1-length signatures are identified. If each of the identified signatures is unique, the sequence of steps ends; else, the k value is incremented in the next phase. Further, at least one embodiment of the invention can additionally include identifying the smallest number of signatures by including only those transactions in the next phase which had collided in the first phase. By way merely of illustration, consider an example scenario wherein k=2, and for two templates, T1 and T2, the signature is constructed by selecting the $3^{rd}$ and $5^{th}$ keyword from both of templates. If both of these words (the $3^{rd}$ and $5^{th}$ word) are the same, the word position ($3^{rd}$ and $5^{th}$) as well as the value thereof is also the same. Accordingly, if a user was to simply look at the $3^{rd}$ and $5^{th}$ keywords of an incoming record, the user will not be able to tell if the incoming record is template T1 or T2. This is referred to herein as collision. A solution to such a scenario is to extend the signature of one of the two templates by selecting one or more keywords from its template (thereby making it unique).

By way of further illustration, consider the continued example (detailed above), wherein in the first phase, the 1-length signature for each transaction is $\{4\}$. Additionally, assume that when this signature is analyzed, it is determined that the signature for transaction $T_3$ and $T_5$ have the same word $W_4$. Hence, by hashing only on $W_4$, an example embodiment of the invention will not be able to determine if the transaction is of type $T_3$ or $T_5$. Therefore, in next phase, only transactions $T_3$ and $T_5$ are included. Additionally, the signature for these two transactions is extended to $\{2, 4\}$.

After analyzing the signature, further assume that it is determined that keyword $W_2$ is different. In such an instance, the algorithm stops and k is set to 2. Note also that $\{2\}$ cannot be maintained as the only signature (instead of $\{2, 4\}$) because word $W_2$ was not compared for the remaining transactions $T_1$, $T_2$ and $T_4$. For example, $W_2$ could have collided with any of these transactions. Consequently, the two signatures are deemed to be $\{4\}$ for transaction $T_1$, $T_2$ and $T_4$ and $\{2, 4\}$ for transactions $T_3$ and $T_5$.

As additionally detailed herein, one or more embodiments of the invention include workload tuning. As noted, it can be advantageous to first try those signatures which are likely to be hit more frequently. Therefore, at least one embodiment of the invention includes learning the workload distribution. If the workload is uniformly distributed, the most prevalent signature is tried first. Continuing with the above-noted example, the most prevalent signature would be signature $\{4\}$, as it corresponds to three transaction types. However, if the workload is such that transactions $T_3$ and $T_5$ constitute 80% of all the transactions, then one or more embodiments of the invention can include attempting the signature $\{2, 4\}$ first for improved performance.

Additionally, in at least one embodiment of the invention, the workload distribution can be provided to the algorithm in an offline manner, or the workload distribution can be learned in an online manner as follows. A cache is maintained storing recently-used signatures, and the signatures from such a cache are tried first. Accordingly, as the more popular signatures are likely to be in the signature cache, one or more embodiments of the invention can include mimicking the workload distribution.

Figure 2:
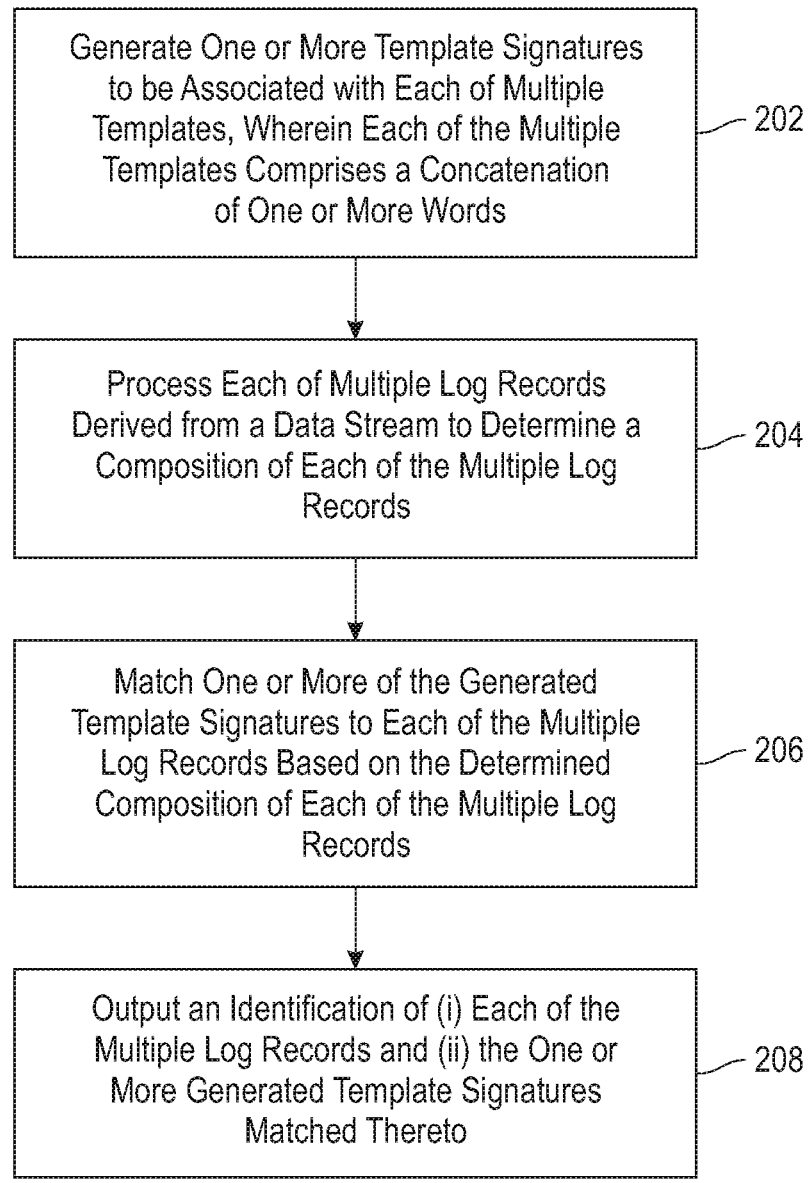
FIG. 2 is a flow diagram illustrating techniques according to an embodiment of the invention.

FIG. 2 is a flow diagram illustrating techniques according to an embodiment of the present invention. Step 202 includes generating one or more template signatures to be associated with each of multiple templates, wherein each of the multiple templates comprises a concatenation of one or more words. In one or more embodiments of the invention, the template signatures each comprise a predetermined length. Additionally, the multiple templates can be derived from a database and/or a dictionary, and as detailed herein, each of the templates can include a concatenation of one or more words that pertain to system and/or application records.

Step 204 includes processing each of multiple log records derived from a data stream to determine a composition of each of the multiple log records. In one or more embodiments of the invention, the data stream can be obtained via a data center. Additionally, the composition of each of the multiple log records can include an arrangement of one or more words.

Step 206 includes matching one or more of the generated template signatures to each of the multiple log records based on the determined composition of each of the multiple log records. Step 208 includes outputting an identification of (i) each of the multiple log records and (ii) the one or more generated template signatures matched thereto. Outputting can include outputting the identification to a database and/or to a user.

The techniques depicted in FIG. 2 can also include determining a frequency with which the generated template signatures are matched to a log record. Determining the frequency can include learning a workload distribution associated with the data stream. Additionally, determining the frequency can also include maintaining a cache that includes each of one or more of the generated template signatures having a determined frequency above a predetermined threshold.

Also, an additional embodiment of the invention includes generating a template signature to be associated with each of multiple templates, wherein each of the multiple templates comprises a concatenation of one or more words, and assigning a unique identifier to each of the generated template signatures. Such an embodiment can also include matching one of the generated template signatures to each of multiple incoming log records based on analysis of each of the multiple log records, and outputting an identification of (i) each of the multiple log records and (ii) the unique identifier assigned to the generated template signature matched thereto.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
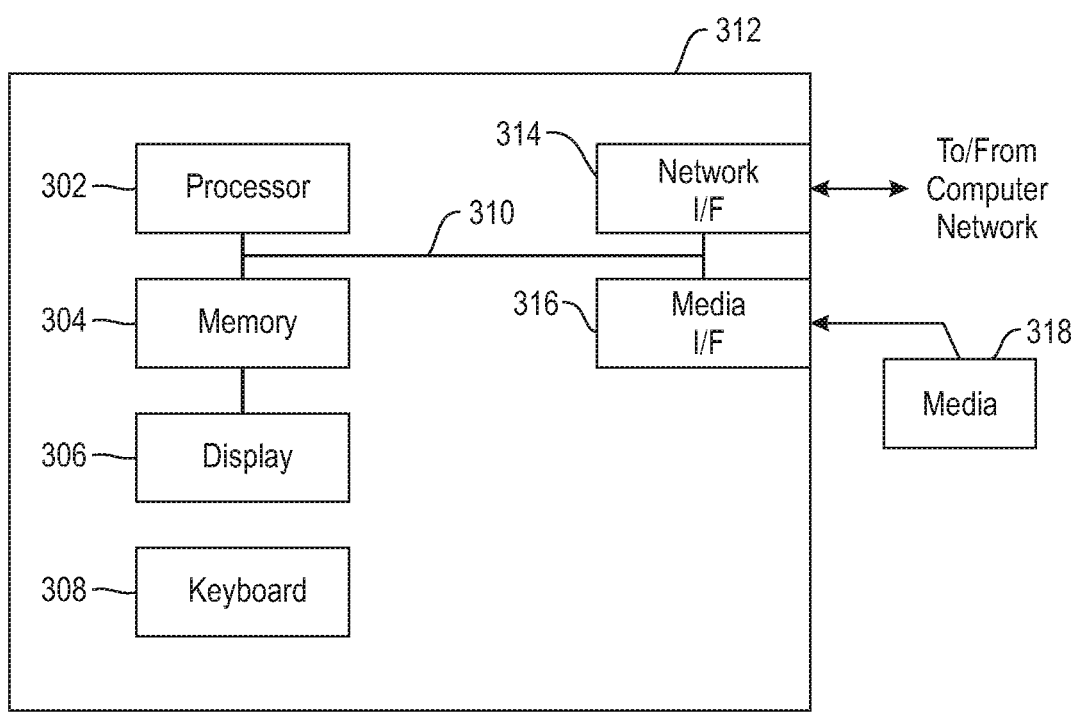
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, associating template identifiers with each log record and identifying template types using template signatures in incoming data logs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating, based on log data records associated with at least one given source, one or more template signatures to be associated with each of multiple templates, wherein each of the multiple templates comprises a concatenation of one or more words and one or more parameters, and wherein said generating the one or more template signatures comprises (i) identifying which particular word appears at which particular location of each of the multiple templates and (ii) ensuring that the one or more template signatures to be associated with each respective one of the multiple templates are unique;
processing each of multiple additional log records, from the same at least one given source, derived from a data stream to determine a composition of each of the multiple additional log records;
matching one or more of the generated template signatures to each of the multiple additional log records based on the determined composition of each of the multiple additional log records;
assigning unique template identifier values to the multiple additional log records, each unique template identifier value corresponding to one of the multiple templates, wherein the unique template identifier values categorize said multiple additional log records at ingestion time:
determining a frequency with which the one or more generated template signatures are matched to at least one of the multiple additional log records; and
outputting an identification of (i) each of the multiple additional log records, (ii) the one or more generated template signatures matched thereto, and (iii) the determined frequency for each of the one or more generated template signatures;
wherein the method is carried out by at least one computing device.

2. The computer-implemented method of claim 1, wherein each of the one or more template signatures comprises a predetermined length.

3. The computer-implemented method of claim 1, wherein said multiple templates are derived from a database.

4. The computer-implemented method of claim 1, wherein each of the multiple templates comprises a concatenation of one or more words that pertain to system and/or application records.

5. The computer-implemented method of claim 1, wherein the data stream is obtained via a data center.

6. The computer-implemented method of claim 1, wherein the composition of each of the multiple additional log records comprises an arrangement of one or more words.

7. The computer-implemented method of claim 1, wherein said outputting comprises outputting the identification to a database.

8. The computer-implemented method of claim 1, wherein said outputting comprises outputting the identification to a user.

9. The computer-implemented method of claim 1, wherein said determining the frequency comprises learning a workload distribution associated with the data stream.

10. The computer-implemented method of claim 1, wherein said determining the frequency further comprises maintaining a cache comprising each of one or more of the generated template signatures having a determined frequency above a predetermined threshold.

11. A computer program product comprising a non-transitory computer readable storage medium having program instructions embodied therewith, the program instructions executable by a device to cause the device to:
generate, based on log data records associated with at least one given source, one or more template signatures to be associated with each of multiple templates, wherein each of the multiple templates comprises a concatenation of one or more words and one or more parameters, and wherein said generating the one or more template signatures comprises (i) identifying which particular word appears at which particular location of each of the multiple templates and (ii) ensuring that the one or more template signatures to be associated with each respective one of the multiple templates are unique;
process each of multiple additional log records, from the same at least one given source, derived from a data stream to determine a composition of each of the multiple additional log records;
match one or more of the generated template signatures to each of the multiple additional log records based on the determined composition of each of the additional multiple log records;
assign unique template identifier values to the multiple additional log records, each unique template identifier value corresponding to one of the multiple templates, wherein the unique template identifier values categorize said multiple additional log records at ingestion time:
determine a frequency with which the one or more generated template signatures are matched to at least one of the multiple additional log records; and output an identification of (i) each of the multiple additional log records, (ii) the one or more generated template signatures matched thereto, and (iii) the determined frequency for each of the one or more generated template signatures.

12. The computer program product of claim 11, wherein each of the one or more template signatures comprises a predetermined length.

13. The computer program product of claim 11, wherein each of the multiple templates comprises a concatenation of one or more words that pertain to system and/or application records.

14. The computer program product of claim 11, wherein said outputting comprises outputting to a database and/or a user.

15. The computer program product of claim 11, wherein said determining the frequency comprises learning a workload distribution associated with the data stream.

16. The computer program product of claim 11, wherein said determining the frequency further comprises maintaining a cache comprising each of one or more of the generated template signatures having a determined frequency above a predetermined threshold.

17. A system comprising:
a memory; and
at least one processor coupled to the memory and configured for:
  generating, based on log data records associated with at least one given source, one or more template signatures to be associated with each of multiple templates, wherein each of the multiple templates comprises a concatenation of one or more words and one or more parameters, and wherein said generating the one or more template signatures comprises (i) identifying which particular word appears at which particular location of each of the multiple templates and (ii) ensuring that the one or more template signatures to be associated with each respective one of the multiple templates are unique;
  processing each of multiple additional log records, from the same at least one given source, derived from a data stream to determine a composition of each of the multiple additional log records;
  matching one or more of the generated template signatures to each of the multiple additional log records based on the determined composition of each of the multiple additional log records;
  assigning unique template identifier values to the multiple additional log records, each unique template identifier value corresponding to one of the multiple templates, wherein the unique template identifier values categorize said multiple additional log records at ingestion time:
  determining a frequency with which the one or more generated template signatures are matched to at least one of the multiple additional log records; and
  outputting an identification of (i) each of the multiple additional log records, (ii) the one or more generated template signatures matched thereto, and (iii) the determined frequency for each of the one or more generated template signatures.

18. A computer-implemented method, comprising:
generating a template signature to be associated with each of multiple templates, wherein each of the multiple templates comprises a concatenation of one or more words, and wherein said generating the one or more template signatures comprises (i) identifying which particular word appears at which particular location of each of the multiple templates and (ii) ensuring that the one or more template signatures to be associated with each respective one of the multiple templates are unique;
assigning a unique identifier to each of the generated template signatures;
matching one of the generated template signatures to one or more of multiple incoming log records based on analysis of each of the multiple log records, wherein said matching comprises assigning the one of the generated template signatures to the one or more of the multiple log records at ingestion time;
determining a frequency with which the matched generated template signature is matched to one or more of the multiple log records; and
outputting an identification of (i) each of the multiple log records, (ii) the unique identifier assigned to the generated template signature matched thereto, and (iii) the determined frequency for the matched generated template signature;
wherein the method is carried out by at least one computing device.

* * * * *